US009172683B2

United States Patent
Farrugia et al.

(10) Patent No.: US 9,172,683 B2
(45) Date of Patent: Oct. 27, 2015

(54) METHOD AND APPARATUS FOR KEY DISTRIBUTION WITH IMPLICIT OFFLINE AUTHORIZATION

(75) Inventors: Augustin J. Farrugia, Cupertino, CA (US); Gianpaolo Fasoli, Palo Alto, CA (US); Nicholas Sullivan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 628 days.

(21) Appl. No.: 13/172,710

(22) Filed: Jun. 29, 2011

(65) Prior Publication Data

US 2013/0003969 A1 Jan. 3, 2013

(51) Int. Cl.
*H04L 29/06* (2006.01)
*H04L 9/08* (2006.01)

(52) U.S. Cl.
CPC ............ *H04L 63/0428* (2013.01); *H04L 9/083* (2013.01); *H04L 9/088* (2013.01); *H04L 9/0827* (2013.01); *H04L 63/10* (2013.01); *H04L 2209/603* (2013.01)

(58) Field of Classification Search
CPC ....... H04L 9/083; H04L 9/088; H04L 9/0827; H04L 63/0428; H04L 63/10; H04L 2209/603
USPC .............................. 380/44, 47, 255, 273, 277
See application file for complete search history.

(56) References Cited

U.S. PATENT DOCUMENTS

| | | | |
|---|---|---|---|
| 7,359,517 B1 * | 4/2008 | Rowe | 380/284 |
| 8,065,713 B1 * | 11/2011 | Vainstein et al. | 726/2 |
| 2006/0126836 A1 * | 6/2006 | Rivas | 380/47 |

OTHER PUBLICATIONS

PCT International Search Report and Written Opinion of the International Searching Authority for International Application No. PCT/US2012/041407, Mailing Date Feb. 22, 2013, (12 pages).
Open Mobile Alliance; DRM Architecture Approved Version 2.0; Mar. 3, 2006; (24 pages).
Turner, S. et al.; Cryptographic Message Syntax (CMS) Symmetric Key Package Content Type; Internet Engineering Task Force (ITEF); Dec. 13, 2010; (29 pages); ISSN: 2070-1721.
PCT International Preliminary Report on Patentability for PCT/US2012/041407 mailed Jan. 16, 2014.

* cited by examiner

*Primary Examiner* — Joseph P Hirl
*Assistant Examiner* — Thomas Gyorfi
(74) *Attorney, Agent, or Firm* — Blakely, Sokoloff, Taylor & Zafman LLP

(57) ABSTRACT

In a Digital Rights Management (DRM) system, cryptographic keys for decrypting distributed assets (such as audio or video media) are distributed using an offline (e.g., non-Internet) method for distribution of the key generation process, with an implicit authorization to use the distributed key generation process. This is used to update an asset key for use by a client such as a media player when a key formula for generating the key for decrypting an asset has been compromised, such as by hackers.

22 Claims, 3 Drawing Sheets

METHOD AND APPARATUS FOR KEY DISTRIBUTION WITH IMPLICIT OFFLINE AUTHORIZATION

FIELD OF THE INVENTION

This disclosure relates to cryptography and the distribution, storage and use of cryptographic keys.

BACKGROUND

Many media distribution systems require the digital media ("content" or "asset") such as video or audio that they distribute to be encrypted with a cryptographic key using an associated cipher process to prevent playback by unauthorized media players. The system for managing these cryptographic keys is called a Digital Rights Management (DRM) system. Many DRM systems involve a client software component (DRM module) in the media players and a server software component (DRM server) that distributes the keys to the client.

Cryptography is the traditional method of protecting data in transit across a computer network. In its typical application, cryptography protects communications (messages) between two mutually trusting parties from thievery or hackers by attack on the data in transit. However, for many digital file transfer applications (e.g. for the transfer of audio or video content), instead the party that receives the content (i.e., the receiving party) might try to break the DRM encryption that the party that supplied the content (i.e., the distributing party) applied to the content. Thus in this case the receiver is not a trusted party per se, but the point is to protect the distributor who owns the content from its misuse by the receiving party. In addition, with the proliferation of network penetration attacks, a third party may well obtain access to the receiving party's computer and thus to the protected content.

In many DRM systems now in use, the weakest link in security is not the encrypted data (message) but rather cryptographic key management and handling. As well known, modern cryptographic systems use keys which are strings of digital values for both encryption and decryption purposes. For instance, one of the more successful DRM systems, which distributes music online, requires that the receiving party's computer to maintain the unencrypted key for each piece of encrypted music in a "key bag" (repository) that is itself encrypted.

This approach has disadvantages. By encrypting the key bag instead of the keys contained in the key bag, this exposes the keys to a potential attack. Similarly to play a piece of content the receiving party's computer must decrypt the entire key bag, retrieve the key for a particular piece of content, and decrypt the content with the retrieved key.

This approach also disadvantageously allows different devices to use different formats for their key bags. The use of different key bag formats for different devices further exposes the keys to penetration when the content is transferred between devices.

Most current DRM systems encrypt content with a "content key" that is applied to an encryption algorithm (process) such AES, triple DES, or RC4. These are well known encryption systems. Typically these are symmetric key systems, that is the same key is used for encryption and decryption. With this method, the entire content is encrypted with a single content key. Normally of course it is relatively easy for users to share the encrypted files in an unauthorized fashion. However without the content key, such shared files are useless. In cases where the content key is discovered, for instance by hackers or other unauthorized users, the content key is often published and made available to the public. This substantially reduces security of the system and allows unauthorized downloading and successful decryption of the content without permission, which is extremely undesirable to the owner of the content. Usually the attackers or hackers share the discovering process, in addition to the keys themselves, and as a result even more keys are discovered and published in a public database. The less experienced users who may not be able to use the discovery process can then access the database, which is often provided in a website, to see if the content key for their particular piece of content, for instance a particular piece of music or video, is published and in turn break the copy protection on material that they have obtained without paying for. This type of attack, also known as a dictionary attack, has been found to be successful.

It is well known that an attack can discover the content key associated with each piece of content. Specifically, the content key typically remains available during play in the memory of the playback device (which is a computer or for instance digital music or video player), or even longer when the end user pauses during play. Specific DRM implementations protect against this "pause attack" already have been implemented.

This dictionary attack is becoming more harmful to owners of the distributed digital content, especially since there are only a few currently available commercially successful systems for distribution of videos and audio. Since there are only a few such systems, hackers, by focusing on the content available via those systems and publishing the content keys, have made unauthorized use of the content even easier.

In a typical DRM system, the pieces of encrypted digital content are maintained on a central server by the content owner or operator of the service. Users then download to their computer via the Internet particular pieces of content such as a song or a video program. The downloaded material is typically downloaded in encrypted form and the content key is transmitted also, often in a separate transmission. This is done for some form of payment. The user can then play the content by decrypting it on his computer or player. This process is transparent to the user if he has purchased an unauthorized piece of digital content since the key accompanies the downloaded file and software installed on the user's computer decrypts the file. It is also possible for the user to download the digital file to a media player. Typically this second download is also performed in the encrypted state and then the decryption occurs upon playback in the player. Again this is transparent for properly purchased content. It is generally been found best if the decryption only occurs upon playback, for security reasons. Of course if the content key has been compromised as described above, that is published, anyone can access the song and transfers of the encrypted files to unauthorized users is easily accomplished and they can then apply the decryption key even though not authorized to do so.

In a typical scenario, a client computer downloads a piece of media (content or asset) to be played from a media distribution server, and the client also contacts a remote license server which provides the DRM license containing the specific cryptographic keys (content or asset key) required to decrypt the content. The DRM module has the necessary machine code instructions in order to open the license file and then decrypt the content or asset for the player, even without a network (e.g., Internet) connection.

So DRM systems are constantly being reverse engineered by attackers (hackers). In some types of attacks, a critical piece of data used in the content decryption process may be published by an attacker. This piece of data may allow an unauthorized party to utilize the DRM module and the license on the machine to perform unauthorized tasks (such as playing the content on a device that is not allowed by the license).

The DRM provider may want to upgrade the DRM module in the client media player to introduce new features or in reaction to security vulnerabilities or attacks on the client DRM module. There are multiple known routes for a DRM module to obtain an update on a computer system. Some methods require the system being upgraded to have Internet connectivity (using a remote loader, or installer program with online registration) and some do not (using a standalone pre-downloaded installer, or installation via a USB drive or an optical media disk).

SUMMARY

A goal of this disclosure is to provide a method for a client to install a new version of a DRM module that removes specific key-related functionality that is critical to media playback or other asset use, and adds replacement key-related functionality, without network (e.g., Internet) connectivity or the need to obtain a new DRM license. Also contemplated is the complementary method performed by the DRM server and the client as an apparatus that performs the method.

Relevant DRM systems usually have the following features: (a) content is delivered over the Internet to a client; (b) content is stored locally on the client platform (a smart phone, set-top device, desktop computer, portable computer) in a long term storage format (e.g., flash memory, or a hard disk); (c) each piece of content is protected by a unique asset key; (d) a key package is sent at the asset delivery time to the client that contains some representation of the asset key; and (e) content usage is performed by a DRM software module at the client that can retrieve the asset key from a given key package (key bag) when so authorized. But the present key distribution method is not limited to use in such DRM systems.

DETAILED DESCRIPTION

Figure 1:
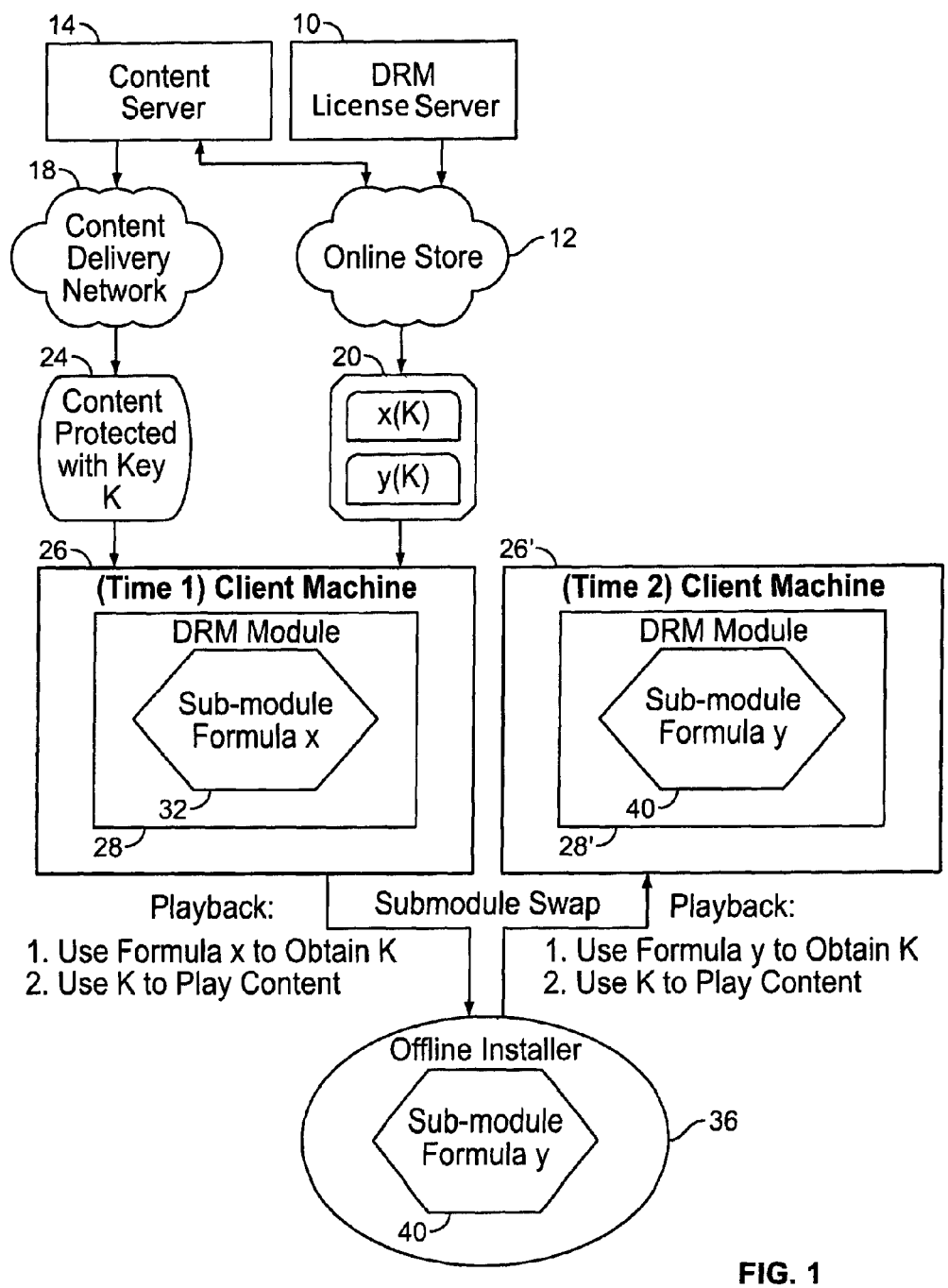
FIG. 1 shows apparatus and a method in accordance with the invention.

In accordance with the invention, a given key package or "key bag" as it is also referred to contains a plurality of (two or more) representations of the (single) asset key. Of course, this asset key may be or include a set of sub-keys, as is conventional. An example of such a key representation is a seed value which when used as the input to a key generation function computes the key. The key function is typically a formula or sequence of steps which may be mathematical, logical (Boolean) or cryptographic. An example of such a function is a key K encrypted using the DES (Data Encryption Standard) symmetric cipher using a DES key designated A. Then the function to recover (compute) the key K is to do a DES decryption operation using key A.

Another example of such a function to derive the key is an arithmetic multiplication. For example, if the key is the value 44 and the key representation x(K) is the number of 4, then the key generation formula is 11*x(K). This is a mathematical formula which may be expressed as a set of machine (computer code—software) instructions. So this formula would be expressed in pseudo-code (a non-executable illustration of actual computer code) as:

```
1. set register1 to 0
2. set register2 to x(K)
3. set register2 to x(K) + x(K)
4. increment register1
5. compare register1 to 11
6. if comparison result is less than 11, jump to 3
7. return register2 as K.
```

Each representation of the asset key is used to recover (generate or derive) the original asset (e.g., content) key by way of a key generation function such as a particular formula (e.g., a mathematical or logical computation) or sequence of actions (such as execution of computer code instructions). Each formula or sequence of actions is contained in a DRM software sub-module to be used by the DRM module on a client platform or computing device (e.g., a smart phone, media player, set-top device, desktop computer, or portable computer). The DRM module resident on a given client computing platform only incorporates one unique and active sub-module at any one time. For each formula or sequence, an associated offline installer program is provided. The installer program exchanges the prior unique sub-module in a DRM module with the new DRM module carrying the new formula or sequence. Typically a key representation associated with a particular formula is indistinguishable from random data (because it is obfuscated by conventional data obfuscation techniques) if it is not consumed by the DRM submodule associated with that formula.

The offline installer program for a particular formula or sequence may be delivered to the client computing device (platform) via offline (e.g., non-network) memory media such as an optical disk or a flash memory or USB drive. Once the offline installer for a particular formula or sequence has been executed, the client computer's DRM module can only consume content that is protected by an asset key for which the key package contains the asset key representation protected with that particular formula or sequence.

Suppose one instance of this method is in effect for which the distributed key package includes two representations of an asset cryptographic key designated K protected with two different formulas (or sequences of instructions), designated respectively x and y. Designate these key representations of K, as x(K) and y(K) respectively. Suppose each DRM module on the various client platforms initially has installed a sub-module for formula x. So to express this algebraically, initially K=x(K(x)). If then at a later time, it is determined that formula x has been compromised (by a hacker, as explained above), the offline installer for formula y is then released to the various client platforms through various conventional channels (e.g., distribution of optical disks, USB drives, a network a software security update, etc.).

Once formula y is thereby installed at the clients, each client may still consume (e.g., view or listen to after decrypting) the asset associated with asset key K, since the DRM module now has the new submodule that understands one of the representations of K in the key package, which is done using new formula y instead of prior formula x. So then K=y(K(y)). This client thereby continues to maintain its authorization to consume the asset using the same key K, but no longer uses the compromised formula x to derive key K. Installation of the sub-module thereby constitutes an implicit DRM authorization to use the new key representation K(y) and formula y, without needing to re-connect and interact via the Internet (or otherwise) with the typically Internet-based DRM license server that originally delivered the key package to the client.

FIG. 1 shows a system as described above, including conventional DRM license server 10 and conventional associated content server(s) 14. (These two servers need not be under control of the same organization or may be on one server platform.) Also provided is a conventional online (Internet based) "store" 12 (typically also a set of computer servers) for vending the assets (content items) to users (clients). Also provided is a content delivery network 18. Elements 18 and 12 typically reside on the Internet. Content server 14 conventionally delivers, via the content delivery network 18, a piece of content or asset 24, protected (encrypted) with an asset (content) key designated K.

Aspects of this system which are not conventional are shown at 20 where the particular piece of content is associated with a key package 20 having at least two representations of content key K, designated here x(K) and y(K). There may be more than two such representations of the content key K in the key package. The separate delivery of key package 20 and content 24 is here illustrative and not limiting.

As is conventional, the asset 24 protected with key K along with the key package 20 are delivered (separately or together) to the client platform or machine or computing device 26 prior to a particular time, designated here Time1. Conventionally the software aspect of client platform 26 includes a mostly conventional DRM module 28. In this case DRM module 28 includes the submodule 32 carrying formula x (or a sequence of actions). At any one time, only one such formula (or set of instructions) is active in the client platform 26. As shown (immediately underneath the client platform 26) at Time1 for playback of the content 24 key generation, formula x is used to calculate or otherwise derive key K using x(K) by calculating K=x(K(x)), and then key K is used to conventionally decrypt and play the content.

However as explained above, at some later time, designated here Time2, the system operator who typically controls the DRM license server 10 and possibly the online store 12, determines that the first key formula x has been compromised. At that time the system operator initiates, via offline installer 36, installation of a new submodule 40 carrying new key generation formula y. This process is referred to in FIG. 1 as the submodule swap. Thus at Time2, the same client computing platform, now designated 26', includes a modified DRM module 28', including the new submodule 40 with key generation formula y. So at Time2 in order to obtain successful playback or other use of asset 24, the client computes K from formula y using y(K) as an input to generate key K by calculating K=y(K(y)) and then uses key K as before to decrypt the asset.

The offline installer 36 further includes specific (computer software) instructions to the client platform 26' to exchange the old submodule 32 with formula x for the new submodule 40 with formula y.

For practical reasons, this exchange from submodule 32 to submodule 40 typically defines or has an associated predetermined grace period during which both submodules 32, 40 may be used to generate key K. This is because due to the offline nature of the present exchange (swap), not all client platforms are updated at the same time. This swap process over the universe of relevant clients may take one or two months or even six months or a year. However, at a certain point in time when the grace period expires, the original submodule with formula x is no longer useful to generate key K based, e.g., on a timing limitation. The expiration is achieved by, e.g., hard coding the time period into the offline installer program, or via an Internet notification to the client.

Figure 2:
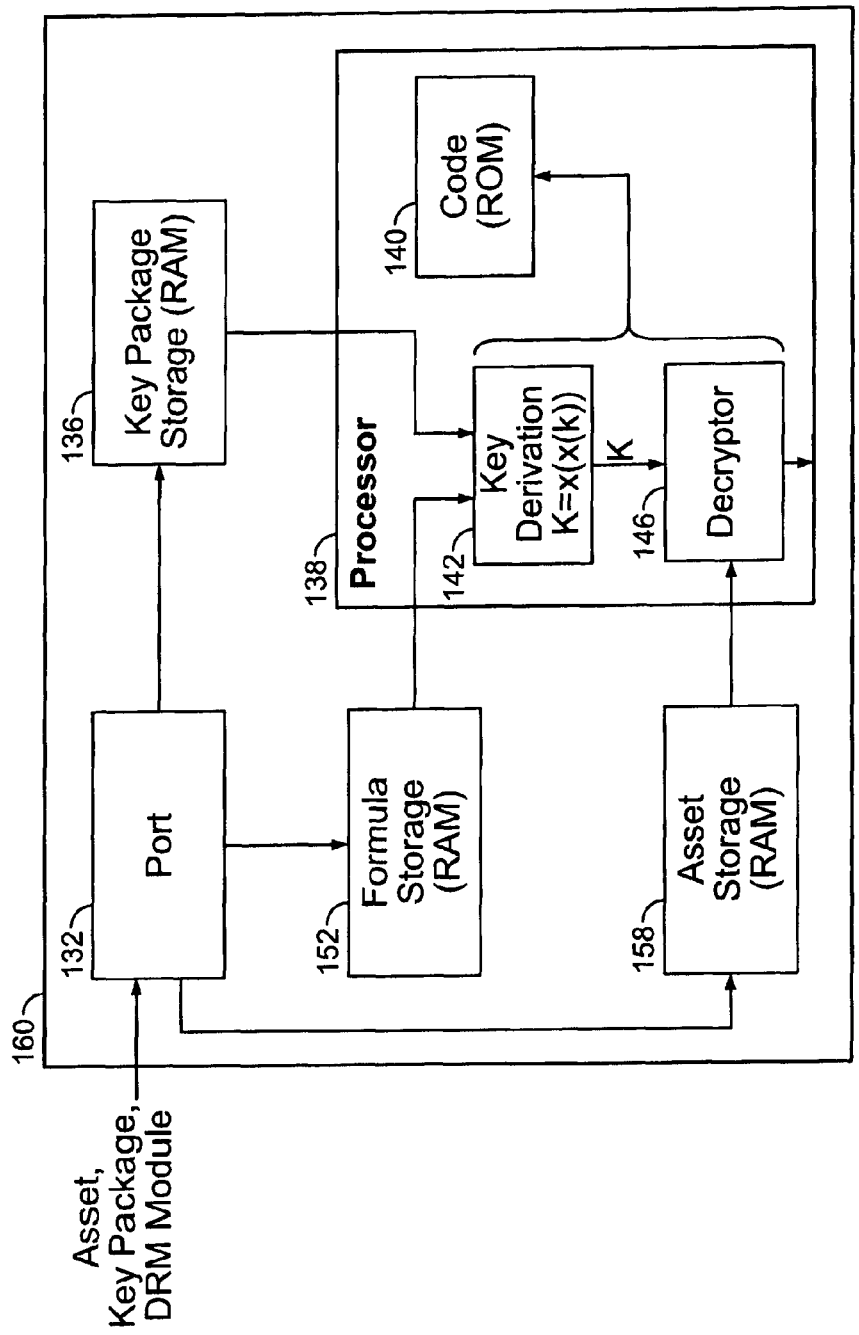
FIG. 2 shows detail of a client apparatus of FIG. 1.

FIG. 2 shows in a block diagram relevant portions of a computing device (system) 160 in accordance with the invention and representing the client 26 or 26' of FIG. 1 which participates in the key distribution replacement process as described above. This is, e.g., a computer, mobile telephone, Smart Phone, personal digital assistant or similar device, or part of such a device and includes conventional hardware components executing in one embodiment software (computer code) which carries out the above swap process. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Not shown is the somewhat similar apparatus which encrypts and protects message, but which is largely similar and may indeed be part of the same platform.

The computer code to carry out the method is conventionally stored in code memory (computer readable storage medium) 140 (as object code or source code) associated with conventional processor 138 for execution by processor 138. The incoming asset, key package, and DRM module (in conventional digital form) is received at port 132 (which may be several ports of different type as described below) and stored respectively in computer readable storage medium (memory) 158, 136 and 152 which are coupled to processor 138. Processor 138 includes key generation module 142 as shown which uses the received DRM module. Another software (code) module in processor 138 is the decryptor module 146 which carries out the decryption of the asset as set forth above using the derived asset key K. Storage locations 136, 140, 152, 158 may be in one or several conventional physical memory devices (such as semiconductor ROM or RAM or their variants or a hard disk drive).

Electric signals conventionally are carried between the various elements of FIG. 2. Not shown in FIG. 2 is subsequent conventional use of the resulting decrypted asset stored in storage 145.

Figure 3:
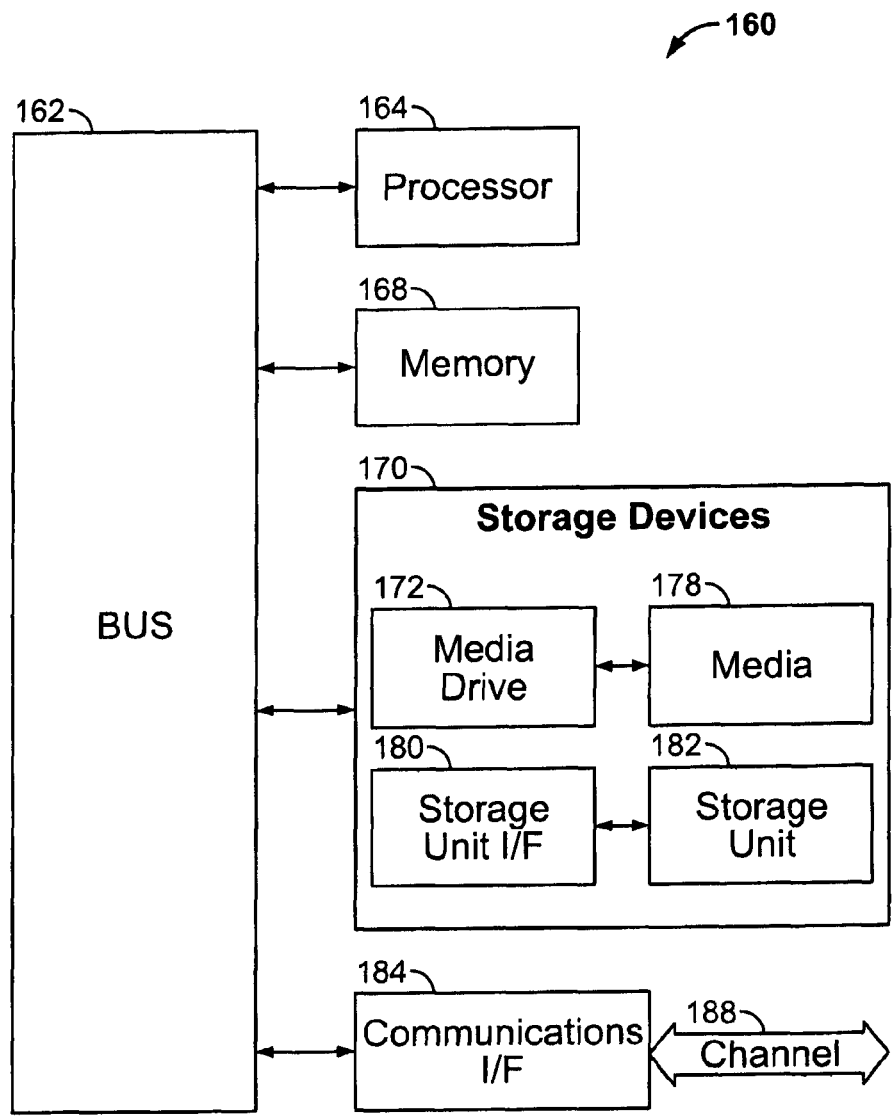
FIG. 3 shows generally a computer device suitable for use in FIGS. 1 and 2.

FIG. 3 shows further detail of the FIG. 2 computing device in one embodiment. FIG. 3 illustrates a typical and conventional computing system 160 that may be employed to implement processing functionality in embodiments of the invention and shows additional detail of the FIG. 2 system. Computing systems of this type may also be used in a computer server as well as a user (client) computer or other computing device, for example. Those skilled in the relevant art will also recognize how to implement embodiments of the invention using other computer or computing systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 2). Processor 164 can be implemented using a general or special purpose processing engine such as, for example, a microprocessor, microcontroller or other control logic. In this example, processor 164 is connected to a bus 162 or other communications medium. Note that in some embodiments the present process is carried out in whole or in part by "hardware" (dedicated circuitry) which is equivalent to the above described software embodiments.

Computing system 160 can also include a main memory 168 (equivalent to memories 136, 140, 152, 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable non-transitory medium that is read by and written to by media drive 172. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to port 132 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 60 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications and improvements will be apparent to these skilled in the art in light of this disclosure and are intended to fall within the scope of the appended claims.

We claim:

1. A method, performed by a computing device, to distribute cryptographic keys, the method comprising:
storing, at a computing device, a key package including a plurality of representations of a cryptographic asset key associated with an asset, wherein each key representation has an associated key generation function to derive the cryptographic asset key;
transmitting the key package to at least one client via a computer network, wherein the client is another computing device;
at a time subsequent to the transmission, delivering to the client a key generation function associated with one of the key representations, accompanied by instructions to derive the cryptographic asset key from the delivered key generation function and the associated key representation in the key package, in place of the key representation and key generation function previously used by the client to derive the cryptographic asset key.

2. The method of claim 1, wherein the key generation functions are each a logical or mathematical formula or a sequence of steps which operate on the associated key representation.

3. The method of claim 1, wherein the key generation functions are obfuscated.

4. The method of claim 1, wherein the delivery is via a computer network or a memory device.

5. The method of claim 1, wherein for a predetermined time period, the instructions permit use also of the previously used key generation function.

6. The method of claim 1, wherein the delivered key generation function and instructions are included in a Digital Rights Management module.

7. A computer server comprising: a processing system;
a memory module, the memory module coupled to the processing system, the processing system configured to:
store, in the memory module, a key package including a plurality of representations of a cryptographic asset key associated with an asset, wherein each key representation has an associated key generation function to derive the cryptographic asset key;
transmit the key package to at least one client via a computer network, wherein the client is another computing device;
at a time subsequent to the transmission, deliver to the client a key generation function associated with one of the key representations, accompanied by instructions to derive the cryptographic asset key from the delivered key generation function and the associated key representation in the key package, in place of the key representation and key generation function previously used by the client to derive the cryptographic asset key.

8. A non-transitory computer readable medium, comprising instructions which when executed by one or more processors executes a method, the method comprising:
   storing, at a computing device, a key package including a plurality of representations of a cryptographic asset key associated with an asset, wherein each key representation has an associated key generation function to derive the cryptographic asset key;
   transmitting the key package to at least one client via a computer network, wherein the client is another computing device;
   at a time subsequent to the transmission, delivering to the client a key generation function associated with one of the key representations, accompanied by instructions to derive the cryptographic asset key from the delivered key generation function and the associated key representation in the key package, in place of the key representation and key generation function previously used by the client to derive the cryptographic asset key.

9. The non-transitory computer readable medium of claim 8, wherein the key generation functions are each a logical or mathematical formula or a sequence of steps which operate on the associated key representation.

10. The non-transitory computer readable medium of claim 8, wherein the key generation functions are obfuscated.

11. The non-transitory computer readable medium of claim 8, wherein the delivery is via a computer network or a memory device.

12. The non-transitory computer readable medium of claim 8, wherein for a predetermined time period, the instructions permit use also of the previously used key generation function.

13. The non-transitory computer readable medium of claim 8, wherein the delivered key generation function and instructions are included in a Digital Rights Management module.

14. A method to receive cryptographic keys, comprising:
   receiving by a computing device, a key package including a plurality of representations of a cryptographic asset key associated with an asset, wherein each key representation has an associated key generation function to derive the cryptographic asset key;
   storing the key package in a first computer readable memory in the computing device;
   receiving an asset protected by the cryptographic asset key;
   storing the asset in a second computer readable memory in the computing device;
   deriving at a processing system in the computing device the cryptographic asset key from a first key generation function stored in a third computer readable memory and from the associated key representation;
   at a subsequent time, receiving, by the computing device, a second key generation function accompanied by instructions to derive the cryptographic asset key from the second key generation function and the associated key representation, in place of the first key generation function;
   storing the second key generation function in a fourth computer readable memory in the computing device;
   deriving the cryptographic asset key at the processing system from the stored second key generation function and the associated key representation; and
   decrypting the stored asset using the newly derived cryptographic asset key.

15. The method of claim 14, wherein the key generation functions are each a logical or mathematical formula or a sequence of steps which operate on the associated key representation.

16. The method of claim 14, wherein the key generation functions are obfuscated.

17. The method of claim 14, wherein delivery of the second key generation function is via a computer network or a memory device.

18. The method of claim 14, wherein for a predetermined time period, the instructions permit use also of the previously used key generation function.

19. The method of claim 14, wherein the second key generation function and instructions are included in a Digital Rights Management module.

20. A computing device comprising:
   a processing system;
   a computer readable memory, the computer readable memory coupled to the processing system, the processing system configured to:
      receive a key package including a plurality of representations of a cryptographic asset key associated with an asset, wherein each key representation has an associated key generation function to derive the cryptographic asset key;
      store the key package in the computer readable memory in the computing device;
      receive an asset protected by the cryptographic asset key;
      store the asset in the computer readable memory in the computing device;
      derive at the processing system in the computing device the cryptographic asset key from a first key generation function stored in the computer readable memory and from the associated key representation;
      at a subsequent time, receive a second key generation function accompanied by instructions to derive the cryptographic asset key from the second key generation function and the associated key representation, in place of the first key generation function;
      store the second key generation function in the computer readable memory;
      derive the cryptographic asset key at the processing system from the stored second key generation function and the associated key representation; and
      decrypt the stored asset using the newly derived cryptographic asset key.

21. A non-transitory computer readable medium, comprising instructions which when executed by a processor executes a method, the method comprising:
   receiving by a computing device, a key package including a plurality of representations of a cryptographic asset key associated with an asset, wherein each key representation has an associated key generation function to derive the cryptographic asset key;
   storing the key package in a first computer readable memory in the computing device;
   receiving an asset protected by the cryptographic asset key;
   storing the asset in a second computer readable memory in the computing device;
   deriving at a processing system in the computing device the cryptographic asset key from a first key generation function stored in a third computer readable memory and from the associated key representation;
   at a subsequent time, receiving, by the computing device, a second key generation function accompanied by instructions to derive the cryptographic asset key from the second key generation function and the associated key representation, in place of the first key generation function;

storing the second key generation function in a fourth computer readable memory in the computing device;

deriving the cryptographic asset key at the processing system from the stored second key generation function and the associated key representation; and decrypting the stored asset using the newly derived cryptographic asset key.

22. A computing apparatus comprising:

a port adapted to receive a key package including a plurality of representations of a cryptographic asset key associated with an asset, wherein each key representation has an associated key generation function to derive the cryptographic asset key;

a first computer readable memory for storing the key package;

the port adapted to receive an asset protected by the cryptographic asset key;

a second computer readable memory for storing the asset;

a processing system adapted to derive the cryptographic asset key from a first key generation function stored in a third computer readable memory and from the associated key representation in the key package;

the port adapted to receive a second key generation function accompanied by instructions to derive the cryptographic asset key from the second key generation function and the associated key representation in the key package, in place of the first key generation function;

the processing system being adapted to derive the cryptographic asset key from the stored second key generation function and the associated key representation responsive to the instructions; and the processing system being adapted to decrypt the stored asset using the newly derived cryptographic asset key.

* * * * *